United States Patent Office 3,440,246
Patented Apr. 22, 1969

3,440,246
PROCESS FOR PREPARING 1,2,5-THIADIAZOLES
Leonard M. Weinstock, Rocky Hill, N.J., assignor to Merck & Co., Inc., Rahway, N.J., a corporation of New Jersey
No Drawing. Continuation of application Ser. No. 514,695, Dec. 17, 1965. This application July 31, 1968, Ser. No. 751,009
Int. Cl. C07d 91/68
U.S. Cl. 260—302    4 Claims

ABSTRACT OF THE DISCLOSURE

There are disclosed 1,2,5-thiadiazole and hydrocarbyl-substituted derivatives thereof, as well as a process for preparing them from the appropriate diamine and a sulfur halide.

---

This is a continuation of application Ser. No. 514,695, filed Dec. 17, 1965, and now abandoned.

This invention relates to the synthesis of 1,2,5-thiadiazoles. More specifically, it relates to new and novel methods of preparing 1,2,5-thiadiazole itself and substituted 1,2,5-thiadiazoles having an alkyl or aryl radical at the 3 and/or 4-positions of the thiadiazole ring. It relates further to novel 3,4-disubstituted-1,2,5-thiadiazoles.

1,2,5-thiadiazole and certain 3-hydrocarbonyl-1,2,5-thiadiazoles have been previously reported in the literature, but the methods heretofore known for obtaining them have not been generally satisfactory. It is an object of this invention to provide a new method of preparing these substances. A more specific object is provision of a process for obtaining 1,2,5-thiadiazole, and 3 and/or 4-hydrocarbonyl-1,2,5-thiadiazoles from aliphatic α-diamines. It is another specific object to provide a synthesis of 3,4-dihydrocarbonyl-1,2,5-thiadiazoles from aliphatic α-dioximes. A further object is to provide the previously unknown 3,4-dihydrocarbonyl-1,2,5-thiadiazoles. Other objects will become clear from the following description of the invention.

In accordance with the present invention, it has now been found that 1,2,5-thiadiazoles of Formula I may be prepared from aliphatic α-diamines by reacting such diamines with a sulfur mono- or dihalide, as shown by the flowsheet:

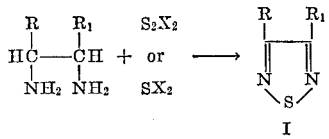

where X represents chlorine or bromine, and R and $R_1$ each represent hydrogen, lower alkyl, or aryl. The aryl radical is preferably, although not necessarily, phenyl or substituted phenyl; the alkyl radical is preferably one having from 1–6 carbon atoms such as methyl, ethyl, isopropyl, butyl and hexyl. In addition, R and R' together may represent a divalent alkylidenyl radical of the formula (—$CH_2$—)$_n$ where n has a value of 3 or 4.

In accordance with a second embodiment of the invention, 1,2,5-thiadiazole compounds of Formula I above are obtained by the reaction of an aliphatic α-dioxime of the formula

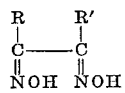

with a sulfur mono- or dihalide, where R and R' each represent hydrogen, lower alkyl or phenyl. Preferably, R and R' are both alkyl radicals having 1–6 carbon atoms such as methyl, ethyl, propyl, isobutyl and hexyl. The lower alkyl groups represented by R and R' may be the same or different in any given compound.

In the preferred embodiments of this invention, it is desirable that the sulfur halide reactant be sulfur monoor dichloride and consequently these halides will be emphasized in describing the process. It should be understood, however, that sulfur mono- or dibromides may be employed if desired, using reaction conditions similar to those for the sulfur chlorides.

Typical examples of 1,2,5-thiadiazoles obtained by the processes of this invention are (a) from sulfur mono- or dichloride and the appropriately substituted aliphatic α-diamine: 1,2,5-thiadiazole, 3-methyl-1,2,5-thiadiazole, 3,4-dimethyl-1,2,5-thiadiazole, 3,4-diethyl-1,2,5-thiadiazole, 3-methyl-4-propyl-1,2,5-thiadiazole, 3-phenyl-1,2,5-thiadiazole, 3-methyl-4-phenyl-1,2,5-thiadiazole, 4,5,6,7-tetrahydro-2,1,3-benzothiadiazole and 1,2-cyclo-propyl-1,2,5-thiadiazole;

(b) From sulfur mono- or dichloride and the appropriately substituted α-dioxime: 3,4-dimethyl-1,2,5-thiadiazole, 3,4-diethyl-1,2,5-thiadiazole, 3-methyl-4-propyl-1,2,5-thiadiazole, 3-ethyl-4-hexyl-1,2,5-thiadiazole, 3-methyl-1,2,5-thiadiazole, 3-ethyl-1,2,5-thiadiazole, 1,2,5-thiadiazole and 3-phenyl-1,2,5-thiadiazole. When either or both of the R and $R_1$ radicals in the α-dioxime are hydrogen, a 1,2,5-thiadiazole is produced but the process frequently leads to mixtures of products since side reactions are prone to occur. For this reason, the aliphatic α-diamines are the preferred starting materials instead of the dioximes when a 1,2,5-thiadiazole having hydrogen at the 3 and/or 4 position is desired.

The synthesis of the 1,2,5-thiadiazoles by the methods of this invention is brought about by contacting the aliphatic α-diamine or aliphatic α-dioxime with sulfur monochloride or sulfur dichloride in a suitable solvent medium. The reaction solvent should, of course, be one that is inert under the reaction conditions, and examples of suitable solvents are benzene, tetrahydrofuran, dimethyl formamide and dialkylalkanoamides such as dimethyl acetamide and diethyl acetamide. Conversion of an α-diamine to the 1,2,5-thiadiazole of Formula I above is preferably brought about at elevated temperatures of between about 50° and 150° C., and preferably between 65° and 125° C. It is convenient to mix the reactants in the solvent at about room temperature and then to heat the entire mass to the desired reaction temperature. Elaboration of the 1,2,5-thiadiazole compound is rapid and in most cases the reaction is essentially complete in at least 3 hours. In many instances shorter reaction times are suitable. For instance, in the preparation of 1,2,5-thiadiazole itself from ethylenediamine and sulfur monochloride, the process is essentially completed merely by heating the reaction mixture slowly to a temperature of about 100–150° C.

The reaction between the aliphatic α-diamine and sulfur monochloride or sulfur dichloride is sufficiently rapid that it is preferred to employ the diamine in the form of an acid addition salt rather than the free base. The acid addition salt dissociates relatively slowly and such process of dissociation serves as a convenient technique for controlling the reaction rate. When the free base is used directly, the reaction may become so rapid that it is difficult to control. It should be understood that the free base rather than the acid addition salt is the actual reacting species and that acid addition salts are preferred merely because they provide a convenient method of controlling the process. Although the particular salt employed is not critical, it has been found convenient to use mineral acid addition salts such as the hydrochloride, hydrobromide, sulfate, or bisulfate. For best results, an excess of sulfur monochloride or sulfur dichloride is employed. The stoichiometry requires 3 moles of sulfur chloride per mole of diamine, and generally from about 3.0 to about 8 moles of sulfur chloride reactant are used per mole of aliphatic α-diamine. Larger amounts do not adversely affect the process but at the same time are of little benefit.

When a 3-R-4-$R_1$-1,2,5-thiadiazole is to be prepared by reaction of an aliphatic α-dioxime with sulfur monochloride or sulfur dichloride, only one mole of sulfur chloride is theoretically required, but for best results from about 2–6 moles of chloride are employed per mole of dioxime. The organic solvents used as the reaction medium are the same as those described previously for the α-diamine process. Formation of the 1,2,5-thiadiazole from the dioxime occurs readily at room temperature in a period of about ½ to 6 hours, and it is generally unnecessary to employ elevated reaction temperatures, although temperatures of up to about 50–60° C. have no adverse effect.

The 3-R-4-$R_1$-1,2,5-thiadiazoles, where R and $R_1$ are as defined above, obtained by the methods of this invention are relatively low boiling materials and are conveniently recovered from the reaction mixture by steam distillation. They may be extracted from the steam distillate into a water-immiscible organic solvent, and finally purified by distillation or sublimation.

The following examples are given for the purpose of illustration and not by way of limitation.

Example 1

A mixture of 26.6 gm. (0.2 m.) of ethylenediamine dihydrochloride and 48.6 ml. (0.6 m.) of sulfur monochloride in 90 ml. of dimethylformamide is heated gradually with stirring to 125° C. in a flask fitted with a distillation side-arm and condenser. The distillate obtained during the heating period is a mixture of 1,2,5-thiadiazole and sulfur monochloride. This distillate is quenched into ice water and the resulting aqueous mixture steam distilled. The distillate is extracted three times with 50 ml. of ethyl ether. The ethyl ether extracts are combined, dried over magnesium sulfate and distilled at atmospheric pressure. The fraction that distills at 94° C. is 1,2,5-thiadiazole. This is a known substance that is useful as a weakly basic organic solvent.

Example 2

7.35 gm. (0.05 m.) of 1,2-diamino propane dihydrochloride and 16.2 ml. (0.2 m.) of sulfur monochloride are added to 25 ml. of dimethylformamide and the resulting mixture heated at 100° C. for two hours. At the end of this time the mixture is cooled to about 60° C., 100 ml. of water added and the resulting aqueous mixture steam distilled. The steam distillate is made just alkaline with sodium carbonate and then extracted with 3× 15 ml. of ethyl ether. The ether layers are separated, combined, dried over magnesium sulfate and finally distilled. The fraction distilling at 120–122° C. is 3-methyl-1,2,5-thiadiazole, $E^{258}$ percent=864 (methanol).

When this experiment is repeated using in place of 1,2-diamino propane dihydrochloride 0.05 mole of 2,3-diaminopentane dihydrochloride or 1,2-diamino-2-phenyl ethane dihydrochloride, there is obtained 3-methyl-4-ethyl-1,2,5-thiadiazole and 3-phenyl-1,2,5-thiadiazole, respectively.

Example 3

21.2 gm. (0.1 m.) of trans 1,2-diamino cyclohexane sulfate is added slowly to a solution of 24.2 ml. (0.3 m.) of sulfur monochloride in 50 ml. of dimethylformamide. External ice-bath cooling is used to maintain the temperature at 45–50° C. The mixture is stirred at 45–50° C. for 2½ hours and then carefully quenched into 150 ml. of water. The resulting aqueous mixture is steam distilled and the aqueous distillate extracted with 3× 10 ml. of hexane. The hexane extracts are combined, washed with 2× 10 ml. of water and then distilled under reduced pressure. The product that distills at 64–65° C./1 mm. is 4,5,6,7-tetrahydro-2,1,3-benzothiadiazole of the structure

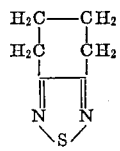

In the ultraviolet, it has $E^{265}$ percent=738 (methanol).

When 1,2-diamino cyclopentane sulfate is employed in the above process in place of the 1,2-diamino cyclohexane sulfate, there is produced 1,2-cyclopropyl-1,2,5-thiadiazole of the formula

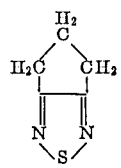

Example 4

11.6 gm. (0.1 m.) of dimethyl glyoxime is added over a 45 minute period to a stirred solution of 32.4 ml. (0.4 m.) of sulfur monochloride in 40 ml. of dimethylformamide. The addition is carried out at a temperature of 25–30° C. The resulting mixture is stirred for two hours at room temperature and then 200 ml. of water added to it. The aqueous mixture is steam distilled, and the steam distillate is made basic with dilute sodium hydroxide and then extracted with 3× 30 ml. of petroleum ether. The organic solvent layers are separated, combined, dried over magnesium sulfate and distilled. 3,4-dimethyl-1,2,5-thiadiazole distills at 146–147° C., $E^{263}$ percent=818 (methanol).

When this experiment is repeated using 13.0 gm. of 2,3-pentanedione dioxime in place of dimethyl glyoxime, 3-methyl-4-ethyl-1,2,5-thiadiazole is obtained.

Example 5

When Example 4 is repeated using 0.4 m. of sulfur dichloride in place of sulfur monochloride, 3,4-dimethyl-1,2,5-thiadiazole is obtained.

Example 6

0.1 mole of 1,2-diaminopropane dihydrochloride is added to a solution of 0.3 mole of sulfur dichloride in 30 ml. of benzene. The mixture is heated at about 60° C. for three hours, then cooled to about 40° C. and mixed with 100 ml. of water. The mixture is made just alkaline with potassium carbonate and the benzene layer separated. The benzene solution is washed with water, dried over magnesium sulfate and concentrated to dryness. The residual 3-methyl-1,2,5-thiadiazole is purified by distillation, B.P. 120–123° C.

The 1,2,5-thiadiazoles obtained as described herein and having an alkyl radical at the 3 and/or 4 position of the thiadiazole ring may be ammoxidized to convert such alkyl group to a cyano radical. This is done by using the process illustrated below for ammoxidation of 3,4-dimethyl-1,2,5-thiadiazole to 3,4-dicyano-1,2,5-thiadiazole.

A vapor mixture of 3,4-dimethyl-1,2,5-thiadiazole, air and ammonia is contacted with a catalyst containing mixed oxides of vanadium and molybdenum on an alumina support at a temperature of about 400° C. and a space velocity of about 165 min.$^{-1}$ (0.36 second contact time). The vapor feed mixture contains 3.5 m. of ammonia per mole of thiadiazole and 29 moles of oxygen (from air) per mole of thiadiazole. The catalyst contains 11.6 weight percent of vanadium pentoxide and 2.3 weight percent of molybdenum oxide, the remainder being alumina. It weighs 13.8 g. and has a surface of about 3 m.²/g. The flow rate of the vapor mixture is the following:

| | Cc. per minute |
|---|---|
| 3,4-dimethyl-1,2,5-thiadiazole | 15.7 |
| Ammonia | 55 |
| Oxygen (from air) | 454 |

The effluent from the reactor is allowed to pass first through a water condenser having 25° C. cooling water circulating therethrough, and about 90% of the 3,4-dicyano-1,2,5-thiadiazole formed is obtained as a solid therein along with inorganic reaction by-products. The 3,4-dicyano-1,2,5-thiadiazole is separated from the by-products by ether extraction. Thereafter, the ether is stripped off to yield the solid product, 3,4-dicyano-1,2,5-thiadiazole. The remainder of the reaction gases, i.e., the effluent from the water condenser, is next passed through a dilute hydrochloric acid scrubber wherein the remainder of the 3,4-dicyano-1,2,5-thiadiazole is absorbed along with unreacted 3,4-dimethyl-1,2,5-thiadiazole, and uncondensed reaction by-products. The acidic solution is then extracted with benzene at a pH of about 2–3 and the organic layer, containing the 3,4-dicyano-1,2,5-thiadiazole, is separated from the aqueous layer which contains the unreacted 3,4-dimethyl-1,2,5-thiadiazole. The 3,4-dicyano-1,2,5-thiadiazole is recovered from the benzene solution by stripping off the benzene in vacuum.

The 3-cyano and 3,4-dicyano-1,2,5-thiadiazole obtained from the 3-alkyl and 3,4-dialkyl-1,2,5-thiadiazole by process described above are converted to the corresponding amides by treating them with dilute aqueous sodium hydroxide according to known methods for the preparation of amides from nitriles. More vigorous hydrolysis, such as by refluxing the cyano thiadiazoles with 10% solution hydroxide for 24 hours leads to formation of the corresponding 1,2,5-thiadiazole carboxylic acids.

The mono-amides may be converted to 3-amino-1,2,5-thiadiazole by reaction with hypochlorite according to known methods. The thiadiazole amides, carboxylic acids and amino derivatives are known compounds.

I claim:
1. The process for preparing a 1,2,5-thiadiazole of the formula

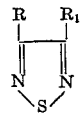

where R and $R_1$ are each hydrogen or loweralkyl, and where only one of R and $R_1$ may be hydrogen, that comprises reacting sulfur monochloride or sulfur dichloride with a diamine of the formula

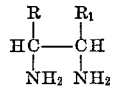

where R and $R_1$ are as defined above.

2. The process of claim 1 wherein the sulfur chloride is sulfur monochloride.

3. The process of claim 2 wherein R is methyl and $R_1$ is hydrogen.

4. The process of claim 1 wherein the diamine is used in the form of a mineral acid addition salt.

References Cited

UNITED STATES PATENTS 3,391,152  7/1968  Weinstock et al. _____ 260—302

ALEX MAZEL, *Primary Examiner.*

R. J. GALLAGHER, *Assistant Examiner.*